US00RE43959E

(19) United States
(12) Reissued Patent
Andersen et al.

(10) Patent Number: US RE43,959 E
(45) **Date of Reissued Patent: *Feb. 5, 2013**

(54) MULTI-LAMP ARRANGEMENT FOR OPTICAL SYSTEMS

(75) Inventors: Odd Ragnar Andersen, Kråkerøy (NO); Kjell E. Olsen, Kråkerøy (NO)

(73) Assignee: projectiondesign as, Krakerov (NO)

( * ) Notice: This patent is subject to a terminal disclaimer.

(21) Appl. No.: 12/108,459

(22) Filed: Apr. 23, 2008

Related U.S. Patent Documents

Reissue of:
(64) Patent No.: 7,033,056
Issued: Apr. 25, 2006
Appl. No.: 10/427,946
Filed: May 2, 2003

U.S. Applications:
(60) Provisional application No. 60/377,250, filed on May 3, 2002.

(51) Int. Cl.
*G02B 7/04* (2006.01)

(52) U.S. Cl. ..... 362/554; 362/560; 362/583; 385/901; 340/815.42

(58) Field of Classification Search ..... 362/554, 362/560, 568, 583; 385/36, 50, 901; 340/815.42, 340/815.43, 901
See application file for complete search history.

(56) References Cited

U.S. PATENT DOCUMENTS 3,564,233 A * 2/1971 Cox et al. ..... 40/444
3,829,857 A * 8/1974 Allan et al. ..... 340/815.43
4,283,716 A * 8/1981 Pasquali ..... 385/115
4,750,798 A * 6/1988 Whitehead ..... 385/133
5,765,934 A * 6/1998 Okamori et al. ..... 353/94
5,852,693 A * 12/1998 Jeong ..... 385/47
5,905,545 A * 5/1999 Poradish et al. ..... 348/743
6,002,452 A * 12/1999 Morgan ..... 348/742
6,270,244 B1 * 8/2001 Naum ..... 362/583
6,478,431 B1 * 11/2002 Sawamura et al. ..... 353/81
2002/0012111 A1 * 1/2002 Kitano ..... 355/71

FOREIGN PATENT DOCUMENTS

GB 2 041 187 9/1980

* cited by examiner

*Primary Examiner* — Stephen F Husar
(74) *Attorney, Agent, or Firm* — Kilpatrick Townsend & Townsend LLP

(57) ABSTRACT

A multi-lamp arrangement for optical systems comprising two lamps or more (10, 15) and a collective light guide (58), where each lamp is positioned such as to transmit light (20) into respective light guides (36, 46) that are both optically connected to the collective light guide (58). In one embodiment, one of the lamps is optically connected to the collective light guide by means of a mirror (38)-and-prism (40) arrangement and an intermediate light guide (30) and an intermediate mirror (32)-and-prism (34) arrangement. The invention also comprises an augmented color modulator (62) with a number of color fields, where the number of identical color fields are equal to the number of lamps.
The invented multi-lamp system will produce a flux level that is equal to or better than known systems but with fewer lamps, thus yielding reduced material cost, manufaturing cost and operating costs, reduced power consumption and reduced product temeperature.

51 Claims, 5 Drawing Sheets

MULTI-LAMP ARRANGEMENT FOR OPTICAL SYSTEMS

Matter enclosed in heavy brackets [ ] appears in the original patent but forms no part of this reissue specification; matter printed in italics indicates the additions made by reissue.

*This application is a reissue application of Ser. No. 10/427,946 filed May 2, 2003, now U.S. Pat. No. 7,033,056, which claims the benefit of provisional application 60/377,250 filed May 3, 2002.*

TECHNICAL FIELD

The present invention relates to field of optical systems, and more specifically to a multi-lamp arrangement for optical systems comprising two lamps or more and a collective light guide.

BACKGROUND ART

Modern optical systems, such as state of the art image projectors which are quite compact, rely on light sources with high light intensity. Image projectors are also increasingly being used in e.g. simulation systems, which require very sharp and bright images. With the known lamp technology, it very difficult to produce high brightness images from projectors, without having to use high power light sources. Today, similar brighness levels in projectors are obtained by high power Xenon lamps.

Most image projectors use ultra-high-pressure (UHP) lamps with a short arc gap. Lamps termed "short arc gap" typically have an arc gap in the range between 1.0 mm and 1.5 mm. The light emitted by short arc gap lamps has a much better light collection than light emitted by lamps with larger arc gaps, and thus a very good visible light efficiency. It is thus desirable to use lamps with an arc gap as short as possible in modern image projectors, in order to produce the brightest possible image.

Short arc gap lamps are, however, only available at comparatively lower power outputs (e.g. 1.0 mm at 150 W and 1.4 mm at 300 W). In order to produce high quality images by projectors, it is therefore known to arrange two or more short arc lamps in a system.

One such multi-lamp system utilizes an assembly of 4 short arc gap lamps, in a quadratic configuration, each lamp having a parabolic reflector with a condenser lens that focuses the light into a common light guide. This assemly is able to gain 1.5 times the flux of a single lamp system. Typical lamp arc gap for such system is 1.0 mm to 1.3 mm.

It is therefore a need for a multi-lamp system that produces a flux level that is equal to or better than known systems, but with fewer lamps, thus yielding reduced material cost, manufaturing cost and operating costs, reduced power consumption and reduced product temeperature, compared to known systems.

The invented system may utilize shorter arc gap lamps than the presently known technology, thus producing a better image performance.

DISCLOSURE AND SUMMARY OF THE INVENTION

The present invention meets the above mentioned need, in that it provides a multi-lamp arrangement for optical systems comprising two lamps or more and a collective light guide, characterized in that each lamp is positioned such as to transmit light into respective light guides that are both optically connected to the collective light guide.

The invention also provides an augmented color modulator with a number of color fields, for use in an image projector comprising two lamps or more, characterized by the number of identical color fields being equal to the number of lamps.

Preferred embodiments of the invention are disclosed in the dependent claims.

DETAILED DESCRIPTION OF AN EMBODIMENT OF THE INVENTION

Figure 1:
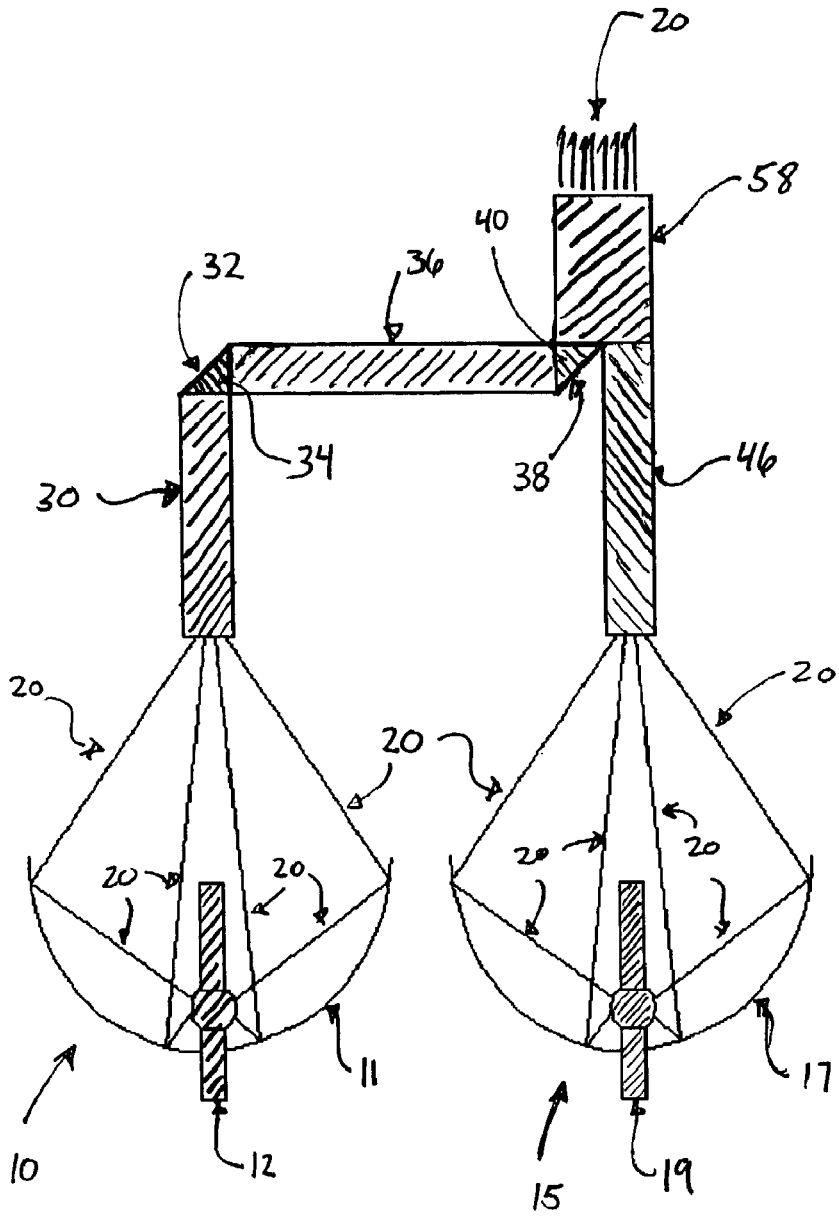
FIG. 1 is a schematic plan view of an embodiment of the invention

FIG. 1 is a schematic plan view of an embodiment of the invention, and shows an arrangemnent comprising two lamps 10, 15, each emitting light schematically illustrated by exemplary light beams 20. The person skilled in the art will understand that the system according to the invention may comprise more lamps than two and be arranged in any configuration.

In general, the multi-lamp arrangement for optical systems according to the invention comprises two or more lamps 10, 15, each lamp positioned such as to transmit light 20 into respective light guides 36, 46 that are both optically connected to a collective light guide 58, out of which the light may be transmitted in any optical system (not shown).

Figure 2A:
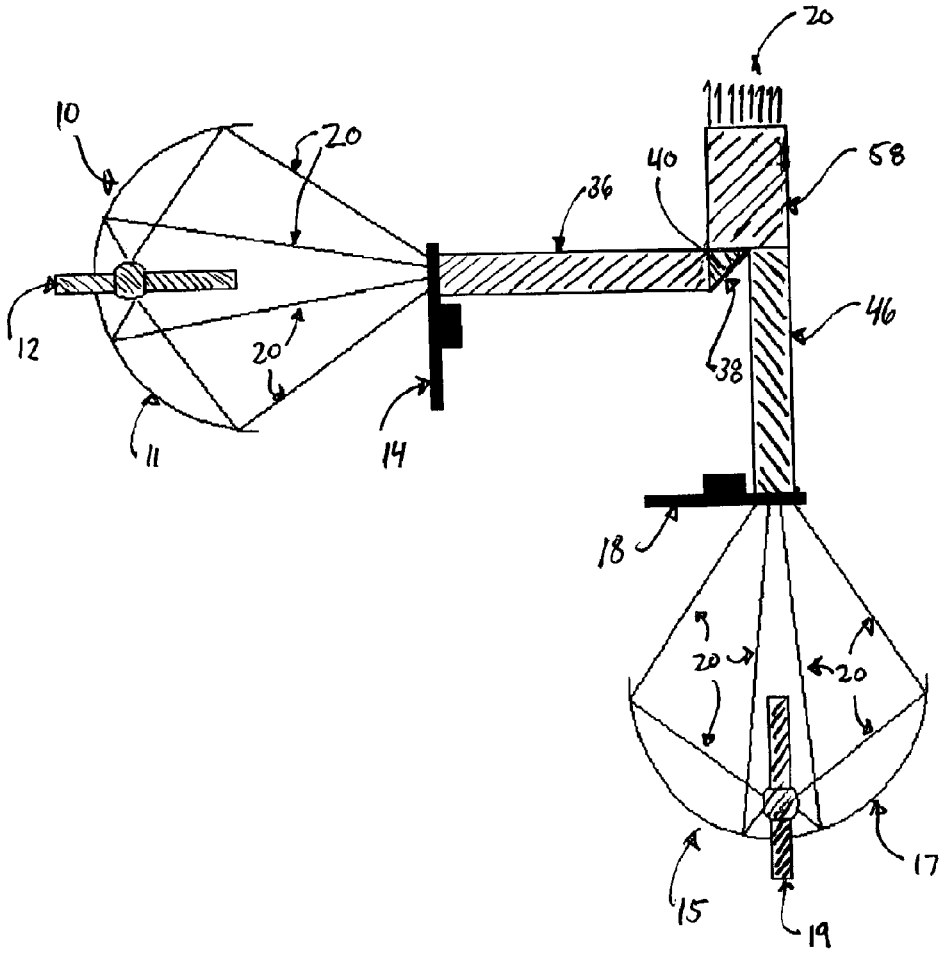
FIG. 2a is a schematic plan view of another embodiment of the invention, including also individual color modulators.
Figure 5:
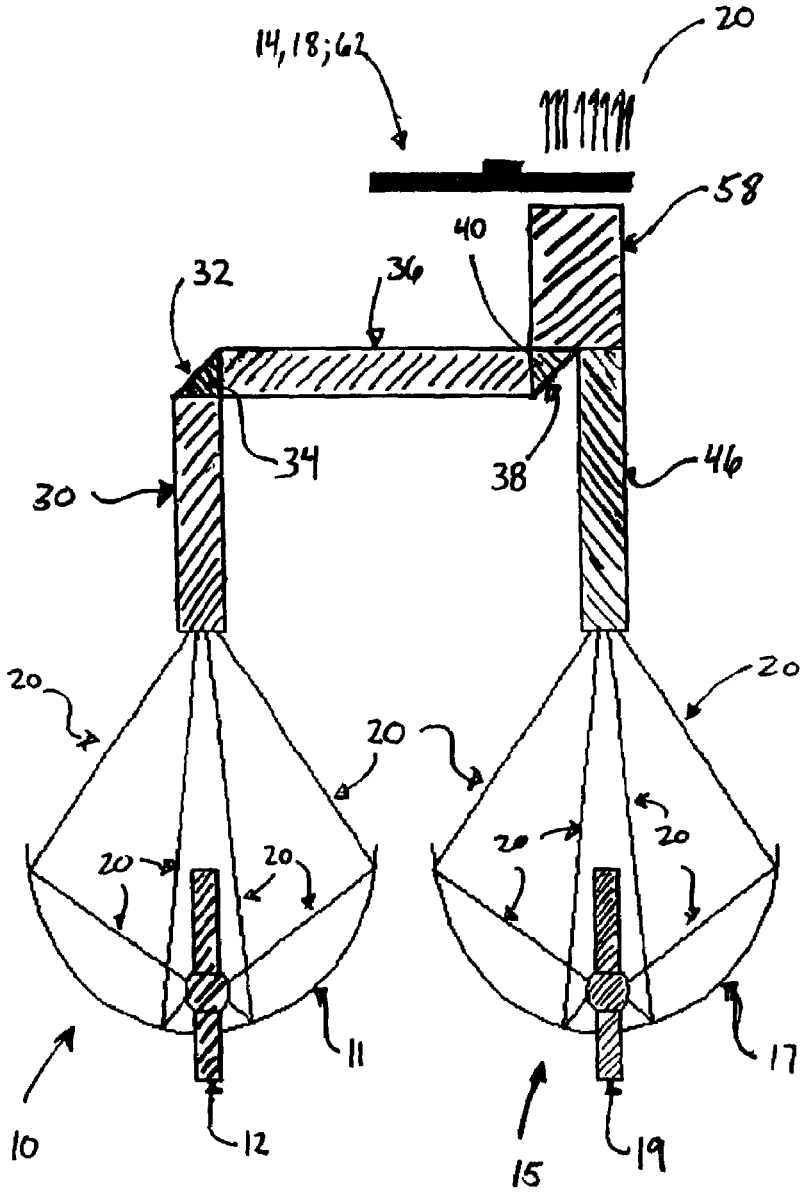
FIG. 5 is a schematic plan view of the embodiment shown in FIG. 1, but with a color modulator positioned on the exit side of the collective light guide.

In one configuration (cf. FIG. 2A), one light guide 36 is optically connected to the collective light guide 58 by means of a mirror 38 and a prism 40. FIG. 2A shows the lamps having individual color modulators 14, 18 positioned between each lamp and their respective light guides, but this is merely to illustrate one application of the multi-lamp arrangement. The color modulator may be any type of sequential color filter system, such as color wheel, color switch, etc., without departing from the the scope of the invention. The invention is not restricted to use with a color modulator, but works equally well with a 3-chip system with color separation (e.g. Philips Prism). The color modulator may also be positioned on the exit side (cf. FIG. 5) or entrance side (not shown) of the collective light guide 58.

Figure 2B:
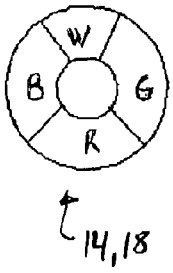
FIG. 2b is a schematic view of a color modulator.

The color modulator may be a conventional color wheel, of which one example is shown in FIG. 2B as having blue (B), white (W), green (G) and red (R) color fields.

FIG. 1 shows a second embodiment, where the lamps are arranged such that a lamp 10 is optically connected to the second light guide 36 by means of an intermediate light guide 30 and an intermediate mirror 32 and prism 34. Here, the lamps are arranged in a side-by-side relationhip, projecting its respective light beams in the same general direction.

In the embodiment shown in FIG. 2A, the first lamp 15 is arranged to project its respective light beams in a direction that is generally perpendicular to the direction of the light emitted from the second lamp. Any lamp orientation is, however, conceivable for a person skilled in the art.

Figure 3:
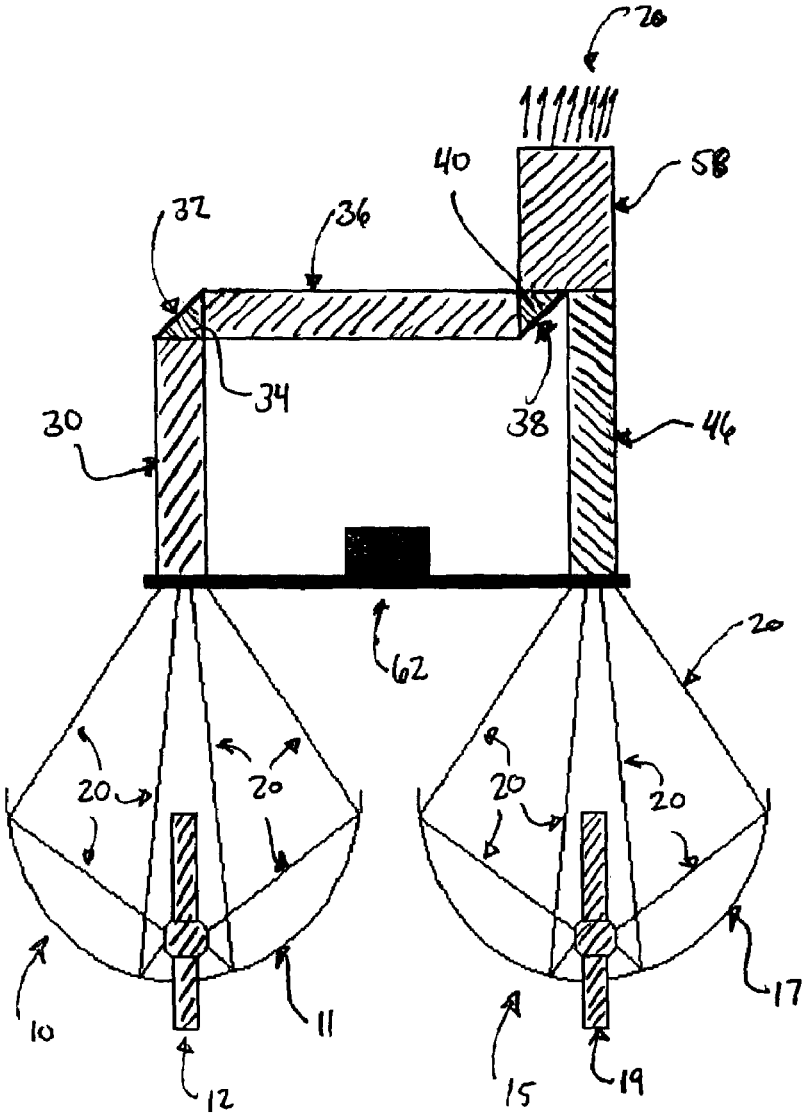
FIG. 3 is a schematic plan view of the embodiment depiced in FIG. 1, but also showing a common, augmented color modulator.

The embodiment of FIG. 1 is shown in FIG. 3, but with an augmented color modulator 62 positioned between each lamp and the intermediate light guide 30 and the first light guide 46, respectively.

Figure 4:
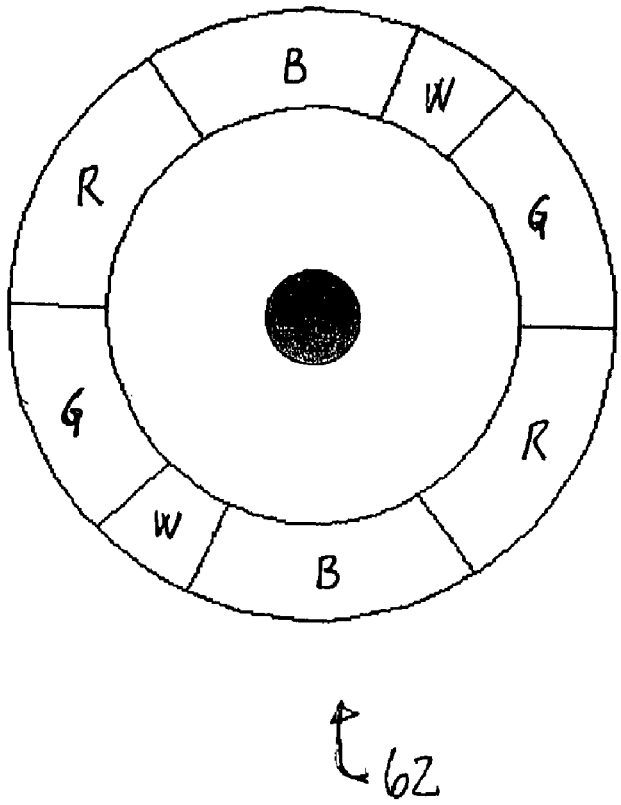
FIG. 4 is a schematic view of the augmented color modulator.

This augmented color modulator 62 comprises a number of color fields (R, B, W, G), but arranged such that the number of identical color fields are equal to the number of lamps. FIG. 4 shows an example of such augmented color modulator, and the fact that the color fields are arranged sequentially: R-B-W-G, R-B-W-G. In the case of a two-lamp system, each color field is arranged diagonally of its respective identical color field. The color modulator is synchronized such that similar respective color fields will be collected into the respective light guides simultaneously.

As shown in FIGS. 2A and 3, the color modulator (14, 18; 62) may generally be positioned in or near the respective lamps' second focal point.

Although it is common to use UHP type lamps, the invention is directed to any type of lamp, including but not limited to metal halide type lamps, or xenon lamps.

Using a two-lamp system, the light guides' entrance aperture will be approximately half the size than for a single lamp system. Thus, in general, the entrance aperture dimensions of each the first 46, second 36 and intermediate 30 light guide each are in the order of one half the entrance aperture dimension of the collective light guide 58. Even more general, for a multi-lamp arrangement, each of the light guide entrance apertures have individual aperture dimensions approximately or exactly equal to the collective light guide 58 aperture dimension divided by the number of lamps.

The light guide may be any appropriate light guide, for example a rod comprising either a solid translucent body or a number of mirrors glued together, forming a tunnel.

LIST OF COMPONENTS SHOWN IN FIGURES

10 second lamp
11 second reflector
12 second burner
14 second color modulator
15 first lamp
17 first reflector
19 first burner
18 first color modulator
20 light beam
30 intermediate light guide
32 intermediate mirror
34 intermediate prism
36 second light guide
38 second mirror
40 second prism
46 first rod
58 collective light guide
62 augmented color modulator

What is claimed is:

1. A multi-lamp arrangement for optical systems comprising two lamps or more and a collective light guide, characterized in that each lamp is positioned such as to transmit light into respective first and second light guides that are both optically connected to the collective light guide and in that the first lamp is arranged to project its respective light beams in a direction that is generally perpendicular to the direction of the light emitted from the second lamp.

2. The multi-lamp arrangement of claim 1, characterized in that the second light guide is optically connected to the collective light guide by a mirror and prism arrangement.

3. The multi-lamp arrangement of claim 1, characterized in that respective color modulators (14, 18) are positioned between each lamp (10, 15) and their respective second and first light guide (36, 46).

4. The multi-lamp arrangement of claim 3, characterized in that the color modulators (14, 18; 62) are positioned in or near the respective lamps' second focal point.

5. The multi-lamp arrangement of claim 3, characterized in that the color modulators (14, 18; 62) are positioned on the exit side of the collective light guide.

6. The multi-lamp arrangement of claim 1, characterized in that the lamps (10, 15) are UHP type lamps.

7. The multi-lamp arrangement of claim 1, characterized in that the lamps (10, 15) are metal halide type lamps.

8. The multi-lamp arrangement of claim 1, characterized in that the lamps (10, 15) are any light source.

9. The multi-lamp arrangement of claim 1, characterized in that the entrance apertures dimensions of each the first and second light guides each are in the order of one half the entrance aperture dimension of the collective light guide.

10. The multi-lamp arrangement of claim 1, characterized in that each of the first and second light guide entrance apertures have individual aperture dimensions approximately or exactly equal to the collective light guide aperture dimension divided by the number of lamps.

11. The multi-lamp arrangement of claim 1, characterized in that at least one of the first and second light guides is optically connected to the collective light guide by a mirror-and-prism arrangement.

12. The multi-lamp arrangement of claim 1, characterized in that the light guides (36, 46) are oriented in a generally perpendicular relationship.

13. The multi-lamp arrangement of claim 2, characterized in that respective color modulators (14, 18) are positioned between each lamp (10, 15) and their respective second and first light guide (36, 46).

14. The multi-lamp arrangement of claim 1, characterized in that an augmented color modulator (62) is positioned between each lamp (10, 15) and the first light guide (30) and the second light guide (46), respectively.

15. The multi-lamp arrangement of claim 1, characterized in that color modulators (14, 18; 62) are positioned on the exit side of the collective light guide.

16. The multi-lamp arrangement of claim 1, characterized in that the entrance apertures dimensions of each the first (46) and second (36) light guides each are in the order of one half the entrance aperture dimension of the collective light guide (58).

17. The multi-lamp arrangement of claim 1, characterized in that each of the first (46) and second (36) light guide entrance apertures have individual aperture dimensions approximately or exactly equal to the collective light guide (58) aperture dimension divided by the number of lamps.

18. The multi-lamp arrangement of claim 14, characterized in that the augmented color modulator (62) comprise a number of identical color fields and the number of identical color fields being equal to the number of lamps.

19. The multi-lamp arrangement of claim 18, characterized in that the color fields are arranged sequentially.

20. The multi-lamp arrangement of claim 18, characterized by each color field being arranged diagonally of its respective identical color field.

*21. An image projector comprising:*

*two or more lamps including a first lamp and a second lamp,*

*a collective light guide that is configured to receive light emitted from the first lamp and light emitted from the second lamp;*

*a first light guide that is optically connected to the collective light guide, wherein the first lamp is positioned to transmit light into the first light guide,*

*wherein the first light guide is arranged to transmit light in a direction that is generally perpendicular to the direction of the light emitted from the second lamp; and*

*a first mirror located intermediate the collective light guide and the first light guide, the first mirror optically connecting the first light guide to the collective light guide.*

*22. The image projector of claim 21, wherein the first light guide is a rod comprising a solid translucent body.*

*23. The image projector of claim 21, wherein the lamps are ultra-high-pressure lamps, and wherein the arc gap of each of the lamps is less than or equal to 1.5 mm.*

*24. The image projector of claim 23, wherein each lamp has a power output of at least 150 W.*

*25. The image projector of claim 21, wherein the collective light guide comprises an exit side, further comprising:*

*at least one color modulator positioned on the exit side of the collective light guide.*

*26. The image projector of claim 21, further comprising:*

*a second light guide optically connected to the collective light guide, wherein the second lamp is positioned to transmit light into the second light guide.*

*27. The image projector of claim 26, wherein the entrance apertures dimensions of each of the first and second light guides is on the order of one half the entrance aperture dimension of the collective light guide.*

*28. The image projector of claim 21, further comprising:*

*a second mirror located intermediate the first lamp and the first light guide, the second mirror optically connecting the first lamp to the first light guide and configured to change a direction of travel of the light from the first lamp.*

*29. The image projector of claim 28, further comprising:*

*an intermediate light guide located intermediate the second mirror and the first lamp, the intermediate light guide optically connecting the light from the first lamp to the second mirror.*

*30. The image projector of claim 29, further comprising:*

*a second light guide optically connected to the collective light guide, wherein the second lamp is positioned to transmit light into the second light guide,*

*wherein the light from the second lamp travels in the second light guide in a direction generally parallel to a direction that light from the first lamp travels in the intermediate light guide.*

*31. The image projector of claim 21, wherein the first and second lamps are arranged side by side.*

*32. The image projector of claim 21, further comprising:*

*one or more augmented color modulators positioned to modulate the light from the first and second lamps, wherein each augmented color modulator comprises a number of identical color fields, the number of identical color fields being equal to the number of lamps.*

*33. The image projector of claim 32, wherein respective modulators are positioned in respective light paths between the lamps and the collective light guide.*

*34. The image projector of claim 21, wherein the first light guide is generally perpendicular to the collective light guide.*

*35. An image projector comprising:*

*two or more lamps including a first lamp and a second lamp;*

*a collective light guide that is configured to receive light emitted from the first lamp and light emitted from the second lamp; and*

*a first light guide that is optically connected to the collective light guide, wherein the first lamp is positioned to transmit light into the first light guide,*

*wherein the first light guide is arranged to transmit light in a direction that is generally perpendicular to the direction of the light emitted from the second lamp, and*

*wherein the first light guide has an entrance aperture dimension approximately or exactly equal to the entrance aperture dimension of the collective light guide divided by the number of lamps.*

*36. The image projector of claim 35, wherein the first light guide is a rod comprising a solid translucent body.*

*37. The image projector of claim 35, wherein the lamps are ultra-high-pressure lamps, and wherein the arc gap of each of the lamps is less than or equal to 1.5 mm.*

*38. The image projector of claim 37, wherein each lamp has a power output of at least 150 W.*

*39. An image projector comprising:*

*two or more lamps including a first lamp and a second lamp;*

*a collective light guide that is configured to receive light emitted from the first lamp and light emitted from the second lamp; and*

*a first light guide that is optically connected to the collective light guide, wherein the first lamp is positioned to transmit light into the first light guide,*

*wherein the first light guide is arranged to transmit light in a direction that is generally perpendicular to the direction of the light emitted from the second lamp, and*

*wherein the first light guide is optically connected to the collective light guide by a mirror-and-prism arrangement.*

*40. The image projector of claim 39, wherein the first light guide is a rod comprising a solid translucent body.*

*41. The image projector of claim 39, wherein the lamps are ultra-high-pressure lamps, and wherein the arc gap of each of the lamps is less than or equal to 1.5 mm.*

*42. The image projector of claim 41, wherein each lamp has a power output of at least 150 W.*

*43. A method of using an image projector comprising a first lamp, a second lamp, a collective light guide that is configured to receive light emitted from the first lamp and light emitted from the second lamp, and a first light guide that is arranged to transmit light in a direction that is generally perpendicular to the direction of the light emitted from the second lamp, the method comprising:*

*providing light from the second lamp to the collective light guide of the image projector;*

*providing light from the first lamp to the first light guide of the image projector; and*

*passing the light in the first light guide to the collective light guide via a first mirror located intermediate the collective light guide and the first light guide.*

*44. The method of claim 43, wherein the first light guide is generally perpendicular to the collective light guide.*

*45. The method of claim 43, wherein the image projector further comprises a second light guide, and wherein providing light from the second lamp to the collective light guide includes:*

*providing the light from the second lamp to the second light guide; and*

*passing the light in the second light guide to the collective light guide.*

*46. The method of claim 43, wherein the light from the first lamp is provided from the first lamp directly to the first light guide.*

*47. The method of claim 43, wherein providing light from the first lamp to the first light guide of the image projector includes:*

*providing the light from the first lamp to a second mirror located intermediate the first lamp and the first light guide, the second mirror optically connecting the first lamp to the first light guide and configured to change a direction of travel of the light from the first lamp.*

*48. The method of claim 47, wherein providing the light from the first lamp to the second mirror includes:*

*providing the light from the first lamp to an intermediate light guide located intermediate the second mirror and the first lamp.*

*49. The method of claim 48, wherein the image projector further comprises a second light guide, and wherein providing light from the second lamp to the collective light guide includes:*

*providing the light from the second lamp to the second light guide; and*

*passing the light in the second light guide to the collective light guide,*

*wherein the light in the second light guide travels in a direction generally parallel to a direction that light in the intermediate light guide travels.*

*50. The method of claim 43, further comprising:*

*providing the light from the first lamp and/or the second lamp to one or more augmented color modulators, wherein each augmented color modulator comprises a number of identical color fields, the number of identical color fields being equal to the number of lamps.*

*51. The method of claim 43, wherein the collective light guide comprises an exit side, further comprising:*

*providing light from the collective light guide to at least one color modulator positioned on the exit side of the collective light guide.*

* * * * *